Patented May 15, 1951

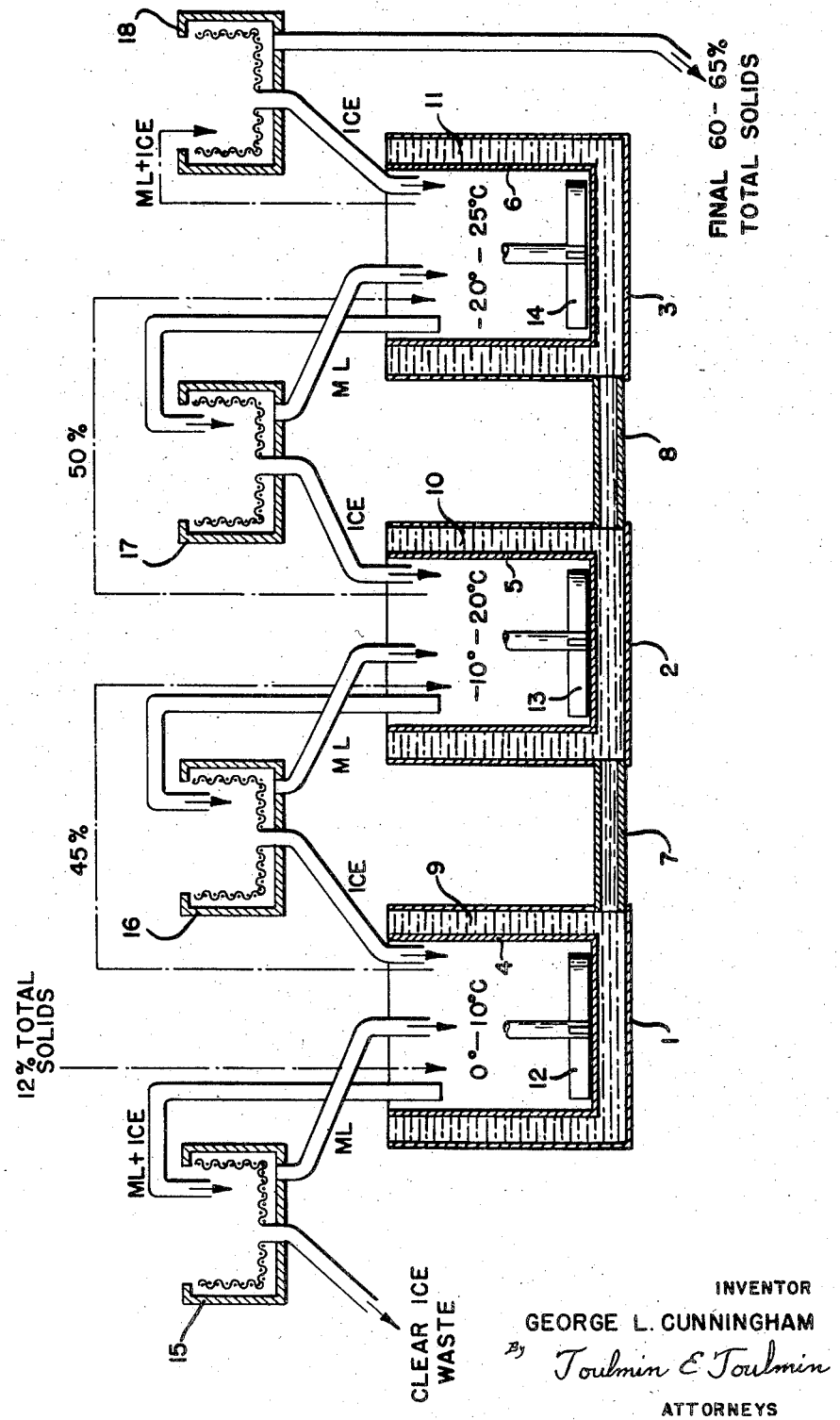

2,552,523

UNITED STATES PATENT OFFICE 2,552,523

METHOD OF EXTRACTING LIQUIDS FROM A SOLUTION TO EFFECT CONCENTRATION

George L. Cunningham, Dayton, Ohio, assignor to The Commonwealth Engineering Company of Ohio, Dayton, Ohio, a corporation of Ohio Application June 18, 1948, Serial No. 33,823

10 Claims. (Cl. 62—124)

The present invention relates to an improved method of extracting liquids from a solution to effect a concentration of such solution.

The term "solution" as used herein is not limited to "true solutions" in the scientific sense but also encompasses so-called "practical solutions." Such practical solutions include solutions in which the solute is partly in suspension or in dispersion in an aqueous menstruum. Typical examples of practical solutions are milk, the juices of fruits and vegetables, maple, cane, beet and sorghum juices and syrups, body fluids and extracts of tissues, and any other substances which in their native state or in modified form contain water.

Four principal methods of bringing about a concentration of a solution have been practiced heretofore, which methods are:

(a) Solar evaporation,
(b) Evaporation by heating,
(c) Removal of water by vacuum with or without heating, and
(d) Freezing the liquid to be removed and eliminating the thus frozen liquid in form of ice.

The present invention deals with the method set forth above under (d), and while applicable to any type of solutions containing liquid adapted to form solvent crystals, the invention will, for the sake of convenience, be described in connection with the extraction of water from fruit juices.

It is a well known phenomenon that the solute from dilute solutions tends to increase in concentration in the liquid portion of a partially frozen solution. This phenomenon has been made use of heretofore to extract the water from fruit juices. To this end a plurality of vessels or containers were set up which were used in progressive but separate steps in the following manner:

(a) First the fruit juice as squeezed out from fresh fruits is subjected to a freezing process. As a result thereof relatively small ice crystals are formed. These crystals, which are frozen water, are then separated from the liquid in the container and removed therefrom.

(b) The remaining liquid constituting a concentrated solution is then transformed to the next container where it is again subjected to a freezing process, however to a temperature somewhat lower than the lowest temperature in the preceding step because this is necessary to start the formation of ice crystals in the now concentrated liquid. Again ice crystals form which are subsequently separated and removed from the liquid concentrate.

(c) The thus further concentrated solution is then transferred to another container with the freezing and ice crystals removing steps continued as described before, but at a still lower temperature, and so forth until the desired concentrate has been obtained.

The drawback of previously known methods consists primarily in that, since the crystals are relatively small while their number is great, the total area of the ice crystals is rather great. As a result thereof, it is unavoidable that a relatively large portion of the minerals, sugars, vitamins, etc., in the liquid are removed with the crystals. The thick layer of viscous mother liquid adheres to the surface of each crystal and is lost with the removal thereof.

It has been suggested to centrifuge the ice crystals of each container prior to their removal from the container to regain part of the layer of mother liquor surrounding each crystal. While this step reduces the thickness of the layer of mother liquor around each crystal, the mother liquor lost with the crystals is still considerable in view of the great number of small crystals present representing a considerable surface area, and the expense of these centrifuges makes the process unattractive economically.

Another known method of removing water from fruit juices makes use of the fact that frozen aqueous solutions, like frozen water itself, lower their melting points under pressure. To this end, only one container is provided in which the entire juice squeezed out from the respective fruits is completely frozen. This frozen mass is then subjected to high pressure with the result that the melting point of the frozen mass is lowered and part of the mass melts and becomes liquid. This liquid is then separated from the frozen mass and represents the concentrated product. Also, this method has the drawback that a considerable quantity of important minerals, sugars, vitamins, etc., will stay on the ice crystals and will be lost with the removal thereof, particularly since in this instance the ice crystals are small and numerous and therefore present a large area. Consequently, also the removal of a considerable quantity of mother liquor with the ice is unavoidable. In addition thereto, this known method requires large quantities of energy which fact materially impairs the commercial application of this method. A further disadvantage is that, when the juice is extracted, the pressure will drop and the press will freeze up.

It is, therefore, an object of this invention to provide an improved method of concentrating solutions which will overcome the above mentioned drawbacks.

It is another object of this invention to provide a method of concentrating solutions without to any practical extent removing valuable minerals and other important ingredients from the original solutions.

A still further object of the invention consists in the provision of a method of concentrating solutions in which the energy required to carry out the process is reduced to a minimum.

These and other objects and advantages of the invention will appear more clearly from the following specification in connection with the accompanying drawing which, while purely diagrammatic, illustrates the principle of the present invention.

Referring to the drawings in detail, the system shown therein comprises a plurality of containers or vessels 1, 2, and 3 covered by any convenient insulating material (not shown in the drawing). While only three vessels are shown in the drawing, it is of course understood that the number of vessels may be varied according to the specific requirements and the solutions involved.

The vessels 1, 2, and 3 surround containers, 4, 5, and 6 respectively while the vessels 1, 2, and 3 are preferably interconnected by pipes 7 and 8, which are likewise properly insulated. The space between each of the vessels 1, 2, and 3 and the containers 4, 5 and 6 respectively located therein is filled with cooling brine 9, 10 and 11 to maintain a desired temperature in the containers 4, 5, and 6. In the specific example shown in the drawing, the temperature in the container 4 is between 0° and —10° centigrade. The temperature in container 5 is held between —10° and —20° centigrade, while the temperature in container 6 is between —20° and —25° centigrade. These temperatures are merely arbitrary and, in practice, will depend on the liquid to be concentrated.

Each of the containers 4, 5, and 6 has mounted therein a stirring device 12, 13, and 14 respectively, which may be operated in any desired manner for stirring the solutions in said containers.

The arrangement, furthermore, comprises a number of separating vessels 15, 16, 17, and 18 each of which preferably has associated therewith a centrifuge for a purpose to be described later.

The separating vessels have two outlets, namely, one for ice crystals and one for the treated liquor. Each separating vessel has at least one inlet for admitting the liquor to be treated.

While the above mentioned elements have been illustrated only diagrammatically, it may be emphasized that the number of the various vessels as well as the cooperating equipment may be varied according to the circumstances involved and that only so much has been shown as is deemed necessary for the full understanding of the new process which will presently be described.

It may now be assumed that a certain fruit juice be concentrated according to the method of the present invention. To this end, the fruit juice as squeezed out from the fruit is received in container 4 where it is subjected to a temperature from 0° to —10° centigrade, while the stirring device 12 is actuated at a low speed, for instance four to eight R. P. M., just enough to keep the liquid moving. As a result of this low temperature, ice crystals are formed from the water in the fruit juice. These ice crystals are rather numerous and small. They are then, together with the mother liquor transferred to the next container 5 which has a prevailing temperature of —10° to —20° centigrade.

Due to the lower temperature existing in the container 5, additional ice crystals will form in the container 5 while not much change will occur in the size of the ice crystals previously formed in the container 4. In this connection it should be noted that the newly forming crystals will be very small. This is due to the fact that the greater the concentration of the solution, i. e., the further the dewatering has proceeded, the smaller will be the crystals. After a predetermined time, the ice crystals together with the mother liquor are transferred to the container 6 and here subjected to a temperature of between —20° and —25° centigrade. Thus, the number of ice crystals received by the container 6 will be increased by additional ice crystals, without any material change in the size of the previously formed ice crystals.

A predetermined time thereafter, the mother liquor and the ice crystals are transferred together to the separating vessel 18 and are here subjected to centrifugal force. As a result thereof, the unfrozen liquid, constituting the concentrated mother liquor is separated from the ice crystals and a part of the viscous layer of the mother liquid around the ice crystals is returned to the mother liquid. If at this time, the ice crystals would be removed from the process, the result would be highly unsatisfactory. This is primarily due to the fact that the ice crystals are relatively small, averaging about 1 to 2 millimeters in length, and consequently have a relatively large outer surface. Therefore, since a rather viscous layer of mother liquor will cover each crystal, it is obvious that quite a considerable amount of mother liquor will cover the relatively large total outer surface of the crystals, and it is this amount which will be lost with the removal of the crystals at this time. Such a large loss would make the process unattractive economically and, in the worst case, would make it almost impossible to operate.

Therefore, according to the present invention, the ice crystals are not removed at this stage of the process but instead are returned to the container 6. Here these ice crystals meet with other oncoming liquor from the container 5 as well as from the separating vessel 17, as will presently appear. This oncoming liquor washes the ice crystals thus returned to the container 6 in counter stream, thereby reducing the thickness of the viscous layer around the crystals which layer has been referred to above. These crystals together with the mother liquor are then transferred to the separating chamber 17 and subjected to centrifugation. This will not only separate the mother liquor from the ice crystals but will also further reduce the thickness of the viscous layer around the crystals.

While the thus centrifuged mother liquor is returned to the container 11 and together with newly forming crystals is then transferred to the separating vessel 18 as described above, the larger crystals centrifuged in the container 17 are passed to container 5. Special emphasis is placed upon the fact that only the larger crystals are transferred from the separating container 17 to the container 5, while the smaller ice crystals are returned together with the mother liquid to the container 6. In practice, a screen covers the outlet from the separating container 17 to the container 6 and has such a mesh that only crystals up to a certain size can pass therethrough, whereas the larger crystals are retained and passed to the container 5.

It will be obvious from the above that now the percentage of larger crystals in the container 5 has been materially increased with regard to the crystals which were there previously present. These large crystals, transferred from the separating container 17 to the container 5 are now kept in the container 5 where they grow further. The passing of fresh mother liquor to the container 5 during this crystal growing process again washes the crystals in counter current stream. This in itself would tend to reduce the viscous layer around the crystals. Since, furthermore, the solution in container 5 is less concentrated than the solution in container 6, it will be obvious that the layer of mother liquor around the increased ice crystals in the container 5 is less viscous. This in its turn, facilitates the washing off of the layer of mother liquor from the increased ice crystals, and inasmuch as the ice crystals have grown, i. e., have reduced their outer surface with regard to their volume, it will be clear that the layer of mother liquor around the crystals is reduced in every respect, namely as to its total quantity and also as to the thickness of the layer.

After the thus grown crystals have been kept in the container 5 for a predetermined time during which the stirring device 13 is preferably operated, mother liquor together with ice crystals is transferred from the container 5 to the separating container 16. Here again the mass is centrifuged by means of a screen or sieve of a certain mesh, ice crystals from a predetermined size upward are temporarily retained in the separation container 16, while the other crystals together with the mother liquor are returned to the container 5. The larger crystals temporarily retained in the separation container 16 are then transferred to the container 4 which is the container receiving the fruit juice as squeezed out from the fruits. Consequently, the solution in container 4 is less concentrated. On the other hand, this container in the specific example described, has only a temperature between 0° and —10° centigrade. These factors favor the growth of the ice crystals transferred into the container 4 from the separating container 16. After these ice crystals have been allowed to grow further in the container 4 for a predetermined time, preferably while the stirring device 12 is operating, they are transferred together with mother liquor to the separating container 15 where the entire mass is centrifuged. As a result, the larger ice crystals, which may average 1 to 2 centimeters in length, will be practically free from mother liquor, and, while the smaller ice crystals with the mother liquor are returned to the container 4, the large ice crystals, which have been retained by a corresponding screen or sieve, are eliminated from the process.

From the preceding description, it will be clear that the process according to the present invention comprises two half-cycles, namely the first half-cycle during which the minute ice crystals are passing from the container 4 to the container 6 without any material growth of the crystals, and the second half-cycle during which the ice crystals are being grown in steps while passing from container 6 to container 4. The concentrated solution is obtained at the end of the first half-cycle after the centrifuging and separating process in the separating container 13, whereas the grown ice crystals are removed at the end of the second half-cycle after the centrifuging and separating process in the separating container 15.

While the invention has been described by setting forth in detail the two individual half-cycles, it is, of course, understood that in practice, these cycles overlap with the cycles of continuously oncoming fresh amounts of mother liquor and ice crystals. This however, it highly beneficial to the washing of the ice crystals which takes place in the counter current flow, and is also beneficial to the growth of the ice crystals.

By the method of the present invention it is possible to provide a food product concentrate that has the requisite amount of essential ingredients without the addition of any preservative agent. Such a concentrate will retain its vitamin content, its natural taste, its minerals and other valuable ingredients, so that there is no substantial change in the taste or food value of the concentrate when the water which has been removed from the original solution in the production thereof is ultimately restored at the time of use. Such food concentrates have been preserved over long periods of time without any addition of preservative agents, and they have been employed as food and as beverages satisfactorily after simply adding water thereto reestablish the original concentration.

It will be understood that one of the essential steps of this process consists in the growing of solvent crystals in progressive steps in counter flow to the oncoming solution to be treated, and then to remove the thus grown crystals when they have reached a predetermined minimum size, thereby leaving a concentrated solution.

It should be noted that the method can be practiced very economically since all the ice is removed at the highest temperature possible.

It is furthermore, to be understood that the invention is by no means limited to the specific steps set forth above but also includes any modification within the scope of the appended claims.

I claim:

1. In a process of concentrating solutions by removal of crystallizable solvent therefrom, the steps comprising forming a series of solutions of progressively increased concentration, maintaining a predetermined temperature in each of the solutions progressively decreasing in the direction of increased concentration, forming solvent crystals in each solution separately, removing crystals greater than a predetermined size from the solutions and transferring them to the less concentrated preceding solution of the series.

2. In a process of concentrating solutions by removal of crystallizable solvent therefrom, the steps comprising forming a stage series of separate solutions of progressively increased concentration, moving the liquid continuously downstream from one stage of the less concentrated solution to the separate stages of more concentrated solution, maintaining a predetermined temperature in each of the solutions progressively decreasing in the direction of increased concentration, forming solvent crystals in each solution separately, removing the crystals greater than a predetermined size from the solutions and transferring them to the less concentrated preceding solution of the series so as to provide for the growth of the crystals progressively as they move countercurrent to the direction of solids concentration.

3. In a process of concentrating solutions by removal of crystallizable solvent therefrom, the steps comprising forming a series of solutions of progressively increased concentration, maintaining a predetermined temperature in each solution to cause formation of solvent crystals, the temperature progressively decreasing in the direction of increased concentration, transferring the solvent crystals and a portion of the solution from each of the more concentrated solutions, separating crystals of predetermined size from said portion, moving the crystals progressively to a less concentrated solution for further growth, returning the portion of solution to the solution from which it was removed, and removing the crystals grown to predetermined minimum size from the most dilute solution.

4. In a process of concentrating solutions by removal of crystallizable solvent therefrom, the steps comprising forming a series of solutions of progressively increased concentration adapted for continuous flow of solution from one to another of the series in stages progressively, progressively decreasing the temperature in stages in the direction of increased concentration in order to form solvent crystals in each solution, continuously delivering dilute solution to the solution of highest temperature, transferring the solvent crystals and at least a portion of the solution from each of the more concentrated solutions, separating solvent crystals from the solution portion transferred, and returning the separated crystals from concentrated solution to the bulk of solution of next high concentration.

5. The method of freeze dehydration of a solution having a crystallizable solvent that consists of, reducing the temperature of a solution in separate stages each having a selected temperature reduction lower than the preceding stage, solidifying the crystallizable solvent from the solution in each stage of temperature reduction in the form of solvent crystals to concentrate the solution thereby, removing from the solution at each stage of temperature reduction solvent crystals greater than a predetermined minimum size, and thereafter transferring the so separated solution and unseparated crystals to a subsequent stage.

6. The method of freeze dehydration of a solution having a crystallizable solvent that consists of, reducing the temperature of a solution in separate stages each having a selected temperature reduction lower than the preceding stage, maintaining a temperature on the solution of substantially the freezing temperature thereof whereby to form solvent crystals, and removing from the solution at each stage of temperature reduction solvent crystals greater than a predetermined minimum size, and thereafter transferring the so separated solution and unseparated crystals to a subsequent stage.

7. In combination in apparatus for extracting crystallizable solvent from a solution comprising a plurality of separate chamber means arranged in liquid flow series arrangement for flow of solution through the chamber means in series, refrigeration means for said chamber means to maintain the plurality of chamber means at selected progressively decreasing temperatures in series, and means in liquid flow arrangement with said chamber means for receiving crystallized solvent and solution therefrom for removal of solvent crystals greater than a predetermined size formed in said chamber means and from contact with solution in any subsequent chamber of the series.

8. In combination in apparatus for extracting crystallizable solvent from a solution comprising a plurality of separate chamber means arranged in liquid flow series arrangement for flow of solution through the chamber means in series, refrigeration means for said chamber means to maintain the plurality of chamber means at selected progressively decreasing temperatures in series, means in liquid flow arrangement with said chamber means for receiving crystallized solvent and solution therefrom for removal of solvent crystals formed in said chamber means and from contact with solution in any subsequent chamber of the series, and means providing liquid flow arrangement between said last mentioned means and the chamber means for returning solution and solvent crystals to the chamber means.

9. In combination in apparatus for extracting crystallizable solvent from a solution comprising a plurality of separate chamber means arranged in liquid flow series arrangement for flow of solution through the chamber means in series, refrigeration means for said chamber means to maintain the plurality of chamber means at selected progressively decreasing temperatures in series, means in liquid flow arrangement with said chamber means for receiving crystallized solvent and solution therefrom for removal of solvent crystals greater than a predetermined size formed in said chamber means and from contact with solution in any subsequent chamber of the series, and means providing liquid flow arrangement between said last mentioned means and the chamber means for returning solution and solvent crystals less than the predetermined size to the chamber means from which the solution was removed.

10. In combination in apparatus for extracting crystallizable solvent from a solution comprising a plurality of separate chamber means arranged in liquid flow series arrangement for flow of solution through the chamber means in series, refrigeration means for said chamber means to maintain the plurality of chamber means at selected progressively decreasing temperatures in series, means in liquid flow arrangement with said chamber means for receiving crystallized solvent and solution therefrom for removal of solvent crystals greater than a predetermined size formed in said chamber means and from contact with solution in any subsequent chamber of the series, means providing liquid flow arrangement between said last mentioned means and the chamber means for returning solution and solvent crystals less than the predetermined size to the chamber means from which the solution was removed, and additional means providing liquid flow arrangement between said second last mentioned means and the chamber means for returning solvent crystals greater than the predetermined size to the chamber means in the series thereof preceding the one from which the solution was removed for separation of the solvent crystals.

GEORGE L. CUNNINGHAM.

REFERENCES CITED

The following references are of record in the file of this patent:

UNITED STATES PATENTS

| Number | Name | Date |
| --- | --- | --- |
| 1,359,911 | Oman | Nov. 23, 1920 |
| 1,576,137 | Johnson | Mar. 9, 1926 |
| 2,225,669 | Taylor | Dec. 24, 1940 |
| 2,337,317 | Eggert | Dec. 21, 1943 |

FOREIGN PATENTS

| Number | Country | Date |
| --- | --- | --- |
| 24,870 | Great Britain | Dec. 22, 1904 |